United States Patent Office 2,792,864
Patented May 21, 1957

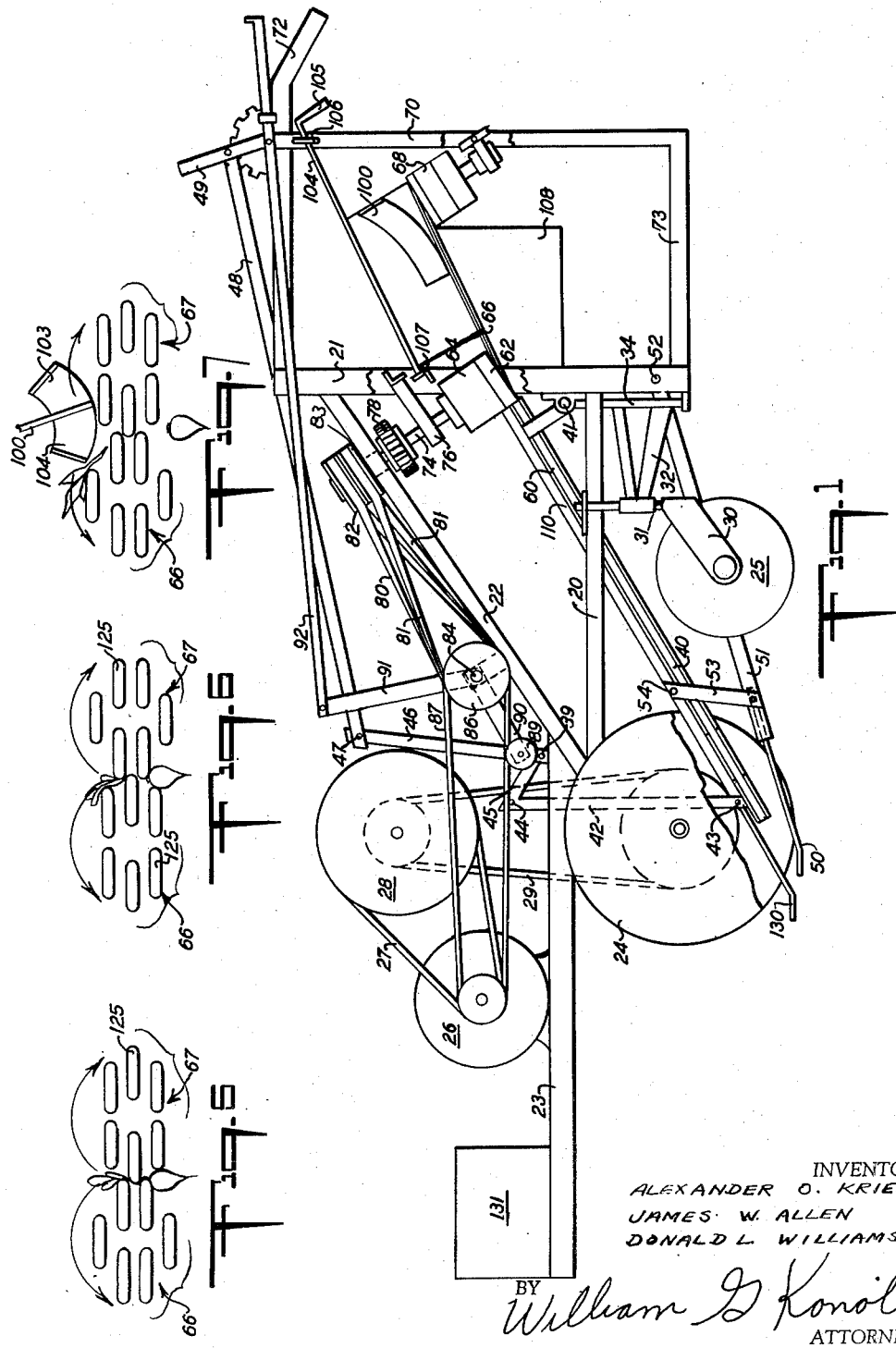

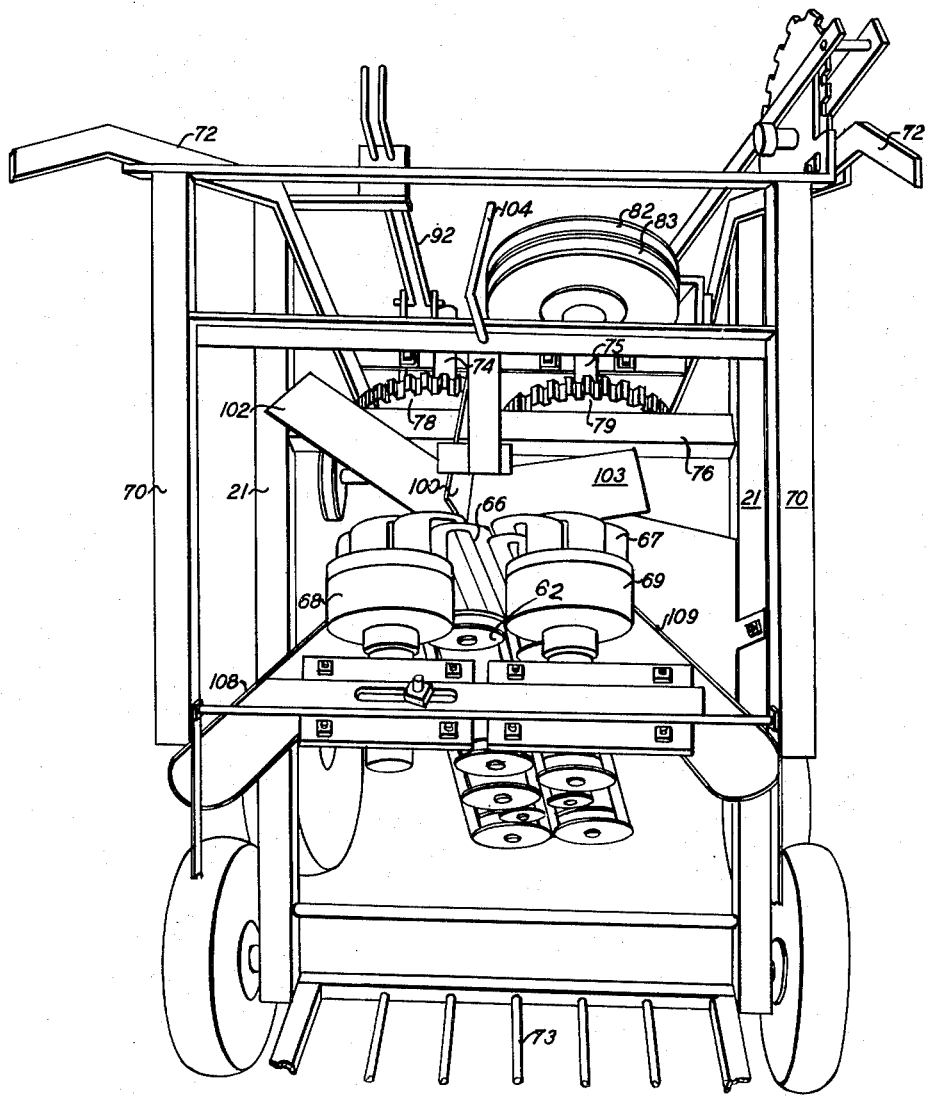

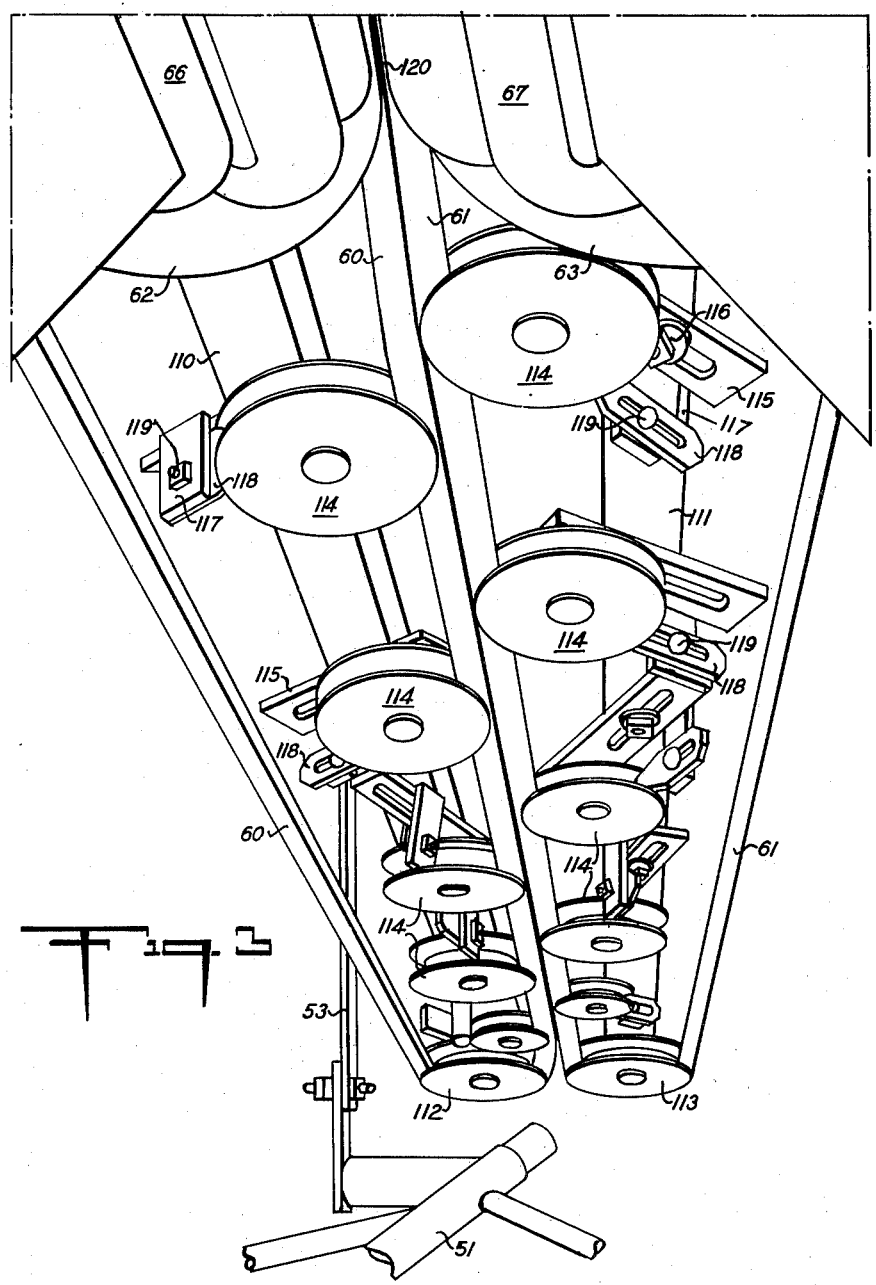

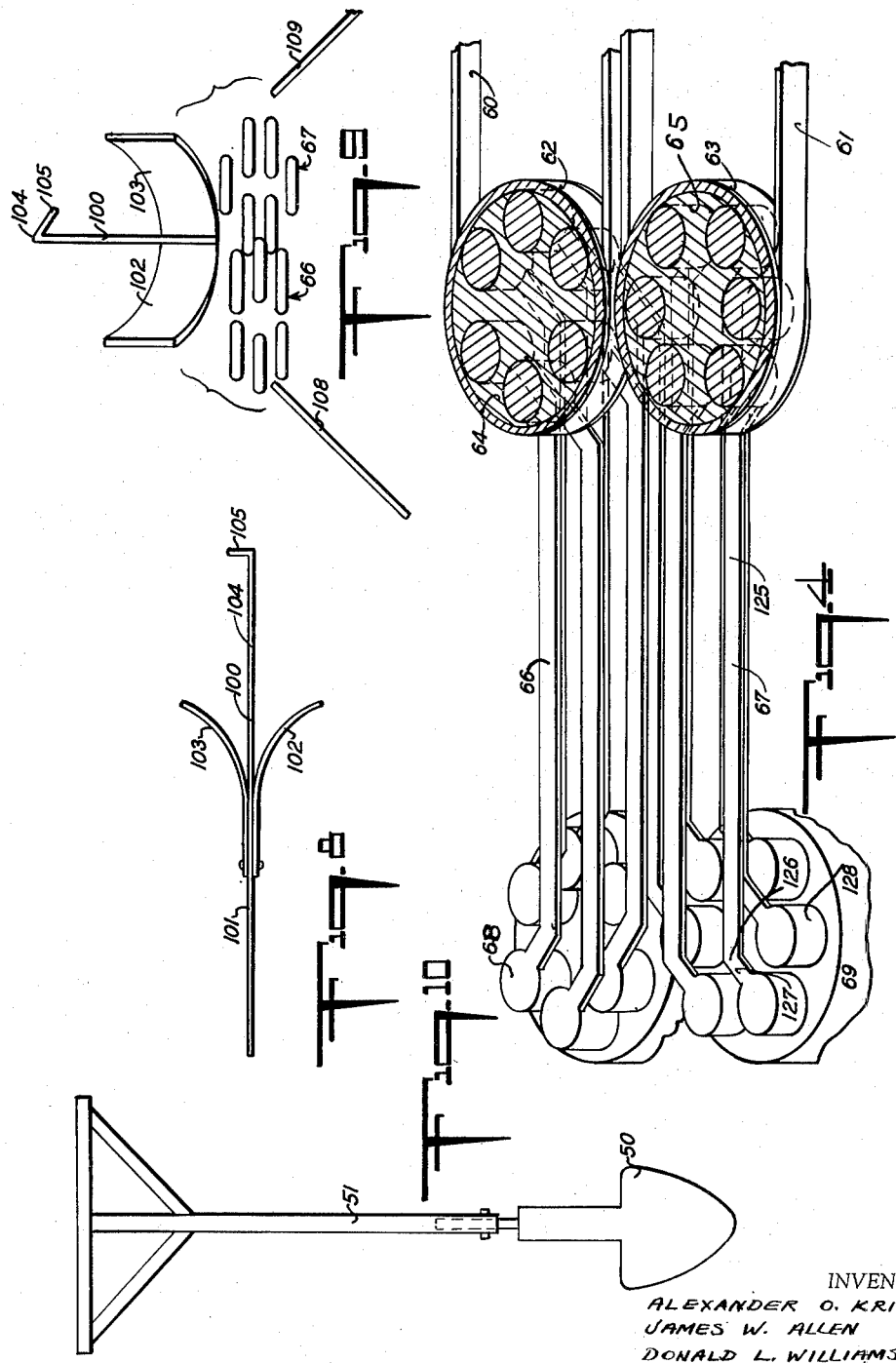

2,792,864
RADISH HARVESTING MACHINE

Alexander O. Krier and James W. Allen, Columbus, and Donald L. Williams, Worthington, Ohio, assignors to Tawco Products Inc., Columbus, Ohio, a corporation of Ohio Application December 8, 1954, Serial No. 473,872

2 Claims. (Cl. 146—81)

This invention relates to a machine for harvesting root type vegetables such as radishes. More particularly, the invention relates to a hand operated machine for picking the radishes from the ground, conveying them to a detopping mechanism, removing the tops from the radishes, discarding the radish tops while retaining the radish root.

Devices of this type have been designed for harvesting such crops but have been subject to several disadvantages. For example, most of the machines are large and cumbersome and not particularly suited for radish harvesting. The machines have either not satisfactorily removed the leaves from the root of the vegetable, or have required expensive complicated mechanisms to effect such removal. In general, where the removal of the leaf from the root is provided, a dangerous slicing mechanism is utilized which, in addition to unsatisfactory performance is most unsuitable for a hand operated machine.

It is an object of the present invention to eliminate the disadvantages of the prior harvesting machines and to provide a machine which is particularly suitable for the radish harvesting operation.

The essence of the machine is found in the unique cooperation between the mechanism which removes the radish from the ground and conveys it upwardly and the detopping mechanism. These two mechanisms are combined in such a manner that they are operated from a single drive shaft which in and of itself is highly advantageous from the standpoint of eliminating unnecessary gears and belts for operating the mechanisms.

The mechanisms are also arranged with respect to each other so that the radish is conveyed from the ground and positively thrust into the detopping device whereby any loss from the vegetables dropping to the ground between the conveying mechanism and the detopping device is eliminated.

It is an object of the invention to provide a radish picking machine having the advantages described above.

It is also an object of the invention to provide a radish picking machine having means for lifting the picking and conveying mechanism up to avoid obstructions in the ground.

It is yet another object of the invention to provide a plow which is separate from the pick up mechanism but connected therewith so that it can be raised out of the path of obstructions along with the lifting and conveying mechanism.

It is still another object of the invention to provide a simple chute mechanism by which the detopped leaves of the vegetable can be thrown to one or the other sides of the radish picking machine at the discretion of the operator.

It is another object of the invention to provide a radish picking machine which is designed for hand operation and which is well balanced so that the hand operation can be performed easily.

These and other objects of the invention will become more readily apparent from a consideration of the following detailed description of the invention taken in conjunction with the accompanying drawings in which:

Fig. 1 is a side elevational view of the invention,

Fig. 2 is an enlarged rear perspective view thereof,

Fig. 3 is an enlarged perspective view showing the bottom of the conveying mechanism, Fig. 4 is a fragmentary perspective view of the detopping mechanism and conveying mechanism, Fig. 5 is a diagrammatic view taken transversely of the topper bars showing the plant as it initially enters between the topper bars and they start to act to remove the top therefrom.

Figure 6 is a view similar to Figure 5 but showing the plant as it has progressed farther between the topper bars and the top is being removed.

Figure 7 is a view similar to Figure 6 but showing progress of the plant through the topper bars to a point where top is completely removed from the root of the plant.

Fig. 8 is a top plan view of the leaf chute,

Fig. 9 is a rear elevation of the leaf chute,

Fig. 10 is a plan view of the plow and mount, and

Fig. 11 is a reduced plan view of the forward end of the conveyor mechanism.

The principal structural member of the radish picker consists of two triangular shaped frames consisting of horizontal bars 20, vertical bars 21 and inclined bars 22 joined together by suitable transverse bars. The front portion of the radish picker is formed by an extension 23 which is rigidly fixed to the triangular frames. It is between these two frame members that the conveyor and topping mechanisms are disposed.

The frame is supported by two main wheels 24 on which the weight of the machine is centered and two balancing wheels 25. The main wheels are journalled to the frame in any suitable manner and driven by an engine 26 through a belt 27, fly wheel 28 and chain drive 29. The engine is positioned with respect to the rest of the machine so that most of the weight of the machine is on the main wheels, but a small portion is on the balancing wheels. The distribution can be altered by adding weights 131 to extension 23.

The axle of the balancing wheels 25 is journalled in a U-shaped member 30. The U-shaped member is fixed to a rod 31 which is pivotally mounted in a support 32 which is in turn pivotally mounted at 34 to the frame member 21. This arrangement of pivotal mountings gives the device a great maneuverability which is necessary in the radish harvesting operation.

The belt conveyor mechanism 40 is pivotally mounted at 41 to frame member 21. The conveyor, at the lower end thereof, is supported by a link 42 connected at one end 43 to the conveyor and at the other end 44 to an arm 45 of a bell crank lever pivoted to the frame member 23 at 39. The other arm 46 of the bell crank lever is connected at 47 to a rod 48. The end of the rod 48 is connected to an actuating lever 49 whereby the belt conveyor can be raised or lowered by operating lever 49 through the above-described linkage.

A plow 50 is removably mounted in one end of a rod 51 the other end of which is pivotally mounted to frame member 21 at 52. The plow rod 51 is supported intermediate its ends by a link 53 which is connected to the belt conveyor at 54. It can be seen that when the belt conveyor 40 is raised, the plow 50 will be raised because of the connecting link 53. The purpose of the plow is to make a very shallow cut in the soil to loosen up the radishes so that they can be more easily removed by the conveyor 40. The removability of the plow is important, since, in most areas the soil is loose and the radish root close to the surface so that no plow is necessary. The harvesting operation will be much faster with the plow removed.

The belt conveyor has two belts 60 and 61 which are operated by pulleys 62 and 63 connected to spaced parallel topper bar heads 64 and 65 which are part of the topper bar units shown. These units are of the general structure disclosed in Urschel Patent No. 1,942,011.

Each head 64 and 65 serves as a bearing into which a set of topper bars 66, 67 respectively, are rotatably mounted. The other ends of the topper bars are rotatably mounted in a rear set of heads 68 and 69. The heads 68 and 69 are supported between a pair of vertical members 70 connected between handle bars 72 and platform 73.

The heads 64, 65 are splined on shafts 74, 75 which are journalled in a support 76 connected to the vertical frame members 21. Gear wheels 78, 79 are also splined on the shafts 74, 75 respectively and have meshing teeth by which the shafts 74, 75 are caused to move synchronously.

The shaft 75 is driven by a pair of belts 80, 81 connected to a pair of pulleys 82, 83 which are fixed to the shaft 75. The belts 80, 81 are driven by pulleys fixed on a shaft 84. In Fig. 1 these pulleys are hidden by the pulley 86 which is fixed to shaft 84 and is driven by the belt 87 connected to the engine 26. The shaft 84 is rotatably mounted in a suitable mounting arrangement to the frame members 22.

The belt 87 is provided with a belt tightener pulley 89 which is mounted on a bell crank lever arm 90. The bell crank lever is pivoted around shaft 84 and the other arm 91 is connected by a rod 92 for operation at the handle bars of the radish picker.

Mounted above the topper bars 66, 67 is a chute arrangement 100 shown in detail in Figs. 8 and 9. The chute consists of a vertically disposed sheet metal member 101 which has welded to either side thereof outwardly and upwardly flaring chutes 102 and 103.

A rod 104 having a handle 105 is fixed to the top edge of the sheet metal member 100. The rod is pivotally mounted to cross bars 106 and 107 extending between frame members 21 and frame members 70 respectively. The arrangement is such that by turning the handle 105, the chute arrangement can be rotated to one side or the other of the topper bars so as to discharge the radish tops to one side or the other of the radish picking machine at the option of the operator. Aprons 108, and 109 at either side of the topper bars cause the discharged radish tops to slide over the platform 73 onto the ground.

In order to permit the chute to be pivoted as described above, the flaring chutes 102, 103 must have their bottom edges curved upwardly to avoid jamming into the topper bars. The curve of the bottom edges should be substantially such that a projection of the lower edge forms an arc of a circle having, as a center the axis of the rod 104.

*Conveyor and topper bars*

The conveyor is supported by two frame members 110 and 111 which are pivotally mounted at 41 to the frame member 21. The conveyor is best shown in Fig. 3 which is a perspective view taken from the rear of the radish picker showing the bottom of the conveyor mechanism.

The belts 60, 61 which are driven by pulleys 62, 63 are, at their other ends, wrapped around pulleys 112 and 113 which are journalled in members 110 and 111. Intermediate belt tightening pulleys 114 are also provided for each belt. Each of these pulleys 114 is mounted on an arm 115 having an elongated slot in the center thereof. The arm 115 is mounted to the frame member 110 or 111 by passing a bolt 116 through the elongated slot and the frame member. The pulley can be adjusted for proper tension on the belt and then the bolt 116 can be tightened to clamp the arm 115 securely in place.

Projecting transversely from the arm 115 is a support 117 for a cleaning blade 118 which is adjustably secured to the support 117 by bolt 119. The cleaning blade 118 removes any mud or other foreign particles which might collect on the pulleys 114.

Figs. 1 and 11 show feelers 130 bolted to frame members 110 and 111. The feelers gather the radish leaves and force them to be channelled into the conveyor belts 60 and 61. The feelers also keep the conveyor structure from jamming into the ground.

The topper bars 66 and 67 are just barely visible in Fig. 3. They show, however, that a radish or like vegetable being conveyed between belts 60 and 61 will be thrust positively into the topper bars 66 and 67 at the area indicated generally at 120.

Fig. 4 also shows the organization of the topper bars and their cooperation with the conveyor mechanism. Each topper bar consists of an elongated rod 125 which, in cross section, is a flat ellipse. The bar is bent at each end at 126 forming a short bar 127 which is connected to a short rod 128 which is journalled in the heads 64, 65 or 68, 69.

The rotation of the heads 64, 65 causes a rotation of each set of bars 66, 67. That rotation is shown in Figs. 5, 6 and 7 which is a sectional view taken through the bars 125. Actually, the bars 125 do not rotate, but slide with respect to one another following an elliptical path in a direction indicated by the arrows in Figs. 5 to 7.

The bars of set 66 mesh with the bars of set 67 to draw the radish upwardly. Because the bars 125 are flat ellipses, and because they mesh in the manner shown in Figs. 5 to 7, the root of the radish is unable to pass through the topper bars. Since the leaves, however, are continually being urged upwardly, the leaves are snapped from the root and the root permitted to drop into a basket mounted on the platform 73 of the machine.

The incoming radishes together with the rotary meshing movement shown in Figs. 5, 6 and 7 causes the radishes to move longitudinally along the topper bars. As the removed radish tops move along the topper bars, they are swept by the outwardly flaring chutes 103, 104 to the side of the radish picking machine.

Referring again to Fig. 4, the important cooperation between the conveyor belt and topper bar arrangement is shown. The conveyor belts are driven by pulleys 62, 63 which surround and are fixed to the topper bar heads 64, 65 respectively as shown in Figure 4. Thus, the pulleys are disposed directly above or outwardly of the plane of the topper bars 125. The path of the belts 60, 61, where they run adjacent to each other, extends to the area 120 which is slightly beyond the beginning point of the topper bars 125 so that the topper bars extend downwardly underneath the conveyor belts. Thus, when the radish has been conveyed to the point 120, its leaves are well above the topper bars 125 and have been moved positively into engagement with the topper bars 125.

*Operation*

In operation, the operator of the machine walks behind the machine grasping the handle bars 72. This is important for, in the picking of radishes, it is necessary for the machine to have great mobility and maneuverability.

The engine 26 causes the wheels 24 to move to propel the machine forward. Simultaneously, the engine is driving the topper bars 66 and 67 and the conveyor belts 60 and 61 through the pulleys 62 and 63. The conveyor belts 60, 61 and topper bars 66, 67 are both driven through the rotation of the single shaft 75 which causes the rotation of the heads 64, 65.

As the machine is propelled forward, the plow 50 (the use of which is optional) loosens the dirt under the radishes ahead of the conveyor belts 60 and 61. The conveyor belts 60 and 61, aided by feelers 130 engage the radish leaves and begin to convey them up to the top of the conveyor belts where they are forced positively into engagement with the topper bars 66 and 67.

The topper bars 66 and 67 snap the tops of the radishes off right at the base of the radish root and the radish roots drop into a basket carried on platform 73. The tops of the radishes are swept to the side of the radish picker by the chute 100.

After the radish picker has been propelled down one row, the radish picker is turned around and handle 105 of the chute 100 turned so as to shift the chute to the opposite side of the topper bars. By proper shifting of the chute, the radish tops will always be cast to the ground over which the machine has already passed. In this, the cut radish tops do not interfere with the picking of new radishes.

If the operator prefers to have more weight forward of the machine, he can add blocks of concrete or the like to the extension of the frame 23 as shown at 131.

In a general manner while there has been disclosed in the above description, that which is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

We claim:

1. For use in a root crop harvesting device, a pair of upwardly inclined coacting conveyor belts, said belts being mounted on pairs of upper and lower pulleys having parallel axes, a topper unit having cooperating sets of bars pivotally mounted on corresponding pairs of rotatable heads, one pair of said heads being connected to and substantially coplanar with said upper pulleys, and the other pair of heads being outwardly and below the plane of said conveyor belts.

2. Structure according to claim 1 in which the upper pulleys which are coplanar with the heads surround the heads and are fixed thereto.

References Cited in the file of this patent

UNITED STATES PATENTS

| | | |
|---|---|---|
| 1,942,011 | Urschel | Jan. 2, 1934 |
| 1,964,896 | Urschel | July 3, 1934 |